US012768121B2

(12) United States Patent
Konate et al.

(10) Patent No.: US 12,768,121 B2
(45) Date of Patent: Oct. 20, 2026

(54) TEMPORARY HOLDING SYSTEM, VESSEL, AND METHOD FOR TEMPORARILY HOLDING, DURING DRIVING OPERATIONS, A FOUNDATION PILE INTENDED TO RECEIVE THE MAST OF AN OFF-SHORE WIND TURBINE

(71) Applicant: REEL, Saint-Cyr-au-Mont-d'Or (FR)

(72) Inventors: Karamoko Konate, Saint-Rogatien (FR); Stephen Mills, L'Houmeau (FR)

(73) Assignee: REEL, Saint-Cyr-au-Mont-d'Or (FR)

(*) Notice: Subject to any disclaimer, the term of this patent is extended or adjusted under 35 U.S.C. 154(b) by 384 days.

(21) Appl. No.: 18/307,613

(22) Filed: Apr. 26, 2023

(65) Prior Publication Data

US 2023/0349121 A1 Nov. 2, 2023

(30) Foreign Application Priority Data

Apr. 29, 2022 (FR) ...................................... 2204072

(51) Int. Cl.

*E02D 13/00* (2006.01)
*E02D 7/14* (2006.01)
*F03D 13/25* (2016.01)

(52) U.S. Cl.

CPC ............... *E02D 13/00* (2013.01); *E02D 7/14* (2013.01); *F03D 13/25* (2016.05); *F05B 2240/95* (2013.01)

(58) Field of Classification Search

CPC ......... E02D 13/00; E02D 13/04; F03D 13/25; B63B 35/03; B63B 35/4406

See application file for complete search history.

(56) References Cited

U.S. PATENT DOCUMENTS

| | | | | |
|---|---|---|---|---|
| 5,492,436 A * | 2/1996 | Suksumake | E02B 17/00 301/5.23 |
| 2017/0275845 A1* | 9/2017 | Belder | E02D 7/06 |

(Continued)

FOREIGN PATENT DOCUMENTS

| | | | |
|---|---|---|---|
| EP | 4208607 A1 | 7/2023 |
| JP | 3128478 B2 | 1/2001 |
| WO | 2022129246 A1 | 6/2022 |

(Continued)

OTHER PUBLICATIONS

Https://www.thefreedictionary.com/about; Dec. 17, 2025.*

(Continued)

*Primary Examiner* — Sean D Andrish
(74) *Attorney, Agent, or Firm* — NIXON & VANDERHYE

(57) ABSTRACT

A system for temporarily holding, during driving operations, a foundation pile (E) intended to receive a mast of an off-shore wind turbine. The temporary holding system (1) includes a sleeve (2) intended to surround a section of the foundation pile (E) and a carrier frame (3) containing an interface module (31). The interface module (31) and a primary section (2*a*) of the sleeve (2) are assembled using bearing means (5) intended to provide said sleeve (2) with a rotational degree of freedom with respect to said interface module (31), about an axis of rotation (R) extending coaxially to said longitudinal axis (21'). The temporary holding system (1) includes rotating means (9), suitable to rotate said sleeve (2) about said axis of rotation (R). A vessel and method are also provided.

14 Claims, 10 Drawing Sheets

(56) References Cited

U.S. PATENT DOCUMENTS

| | | | |
|---|---|---|---|
| 2020/0347960 A1 | 11/2020 | Roodenburg et al. | |
| 2021/0123203 A1* | 4/2021 | Rabaut .................... | E02D 13/04 |

FOREIGN PATENT DOCUMENTS

| | | |
|---|---|---|
| WO | 2022229436 A1 | 11/2022 |
| WO | 2022229455 A1 | 11/2022 |

OTHER PUBLICATIONS

"Temporary Support System for Temporarily Holding a Foundation Pile for Receiving the Mast of an Off-Shore Wind Turbine During Driving Operations." Non-patent literature filed by a third party, Apr. 11, 2025.
Office Action, issued in European Patent Application No. 23170148.3 dated Apr. 16, 2025.
French Search Report for FR2204072 dated Nov. 16, 2022, one (1) page.

* cited by examiner

TEMPORARY HOLDING SYSTEM, VESSEL, AND METHOD FOR TEMPORARILY HOLDING, DURING DRIVING OPERATIONS, A FOUNDATION PILE INTENDED TO RECEIVE THE MAST OF AN OFF-SHORE WIND TURBINE

This application claims priority to FR 2204072 filed Apr. 29, 2022, the entire contents of which are hereby incorporated by reference.

TECHNICAL FIELD OF THE INVENTION

The present invention relates to the technical field of equipment for installing off-shore wind turbines and in particular foundation piles.

More particularly, it relates to temporary holding systems for temporarily holding, during driving operations, a foundation pile intended to receive the mast of an off-shore wind turbine.

STATE OF THE ART

Wind turbines are devices that transform the kinetic energy of wind into electric energy.

They are made of a mast (or tower) carrying a nacelle in which a rotor carrying blades is intended to turn. Within the nacelle, a generator transforms the kinetic energy of the rotor into electric energy.

By way of indication, 8-MW wind turbines have a mast that may reach 140 meters high, with a rotor of 164 meters in diameter. Projects involving large wind turbines with a power between 10 and 15 MW, and therefore also larger sizes, are even contemplated.

A precise implantation of the foundation of these wind turbines is a major issue, all the more so in the case of sea wind turbines.

These foundations indeed support all the loads associated with the weight of the equipment (wind turbines) and the forces applied thereto (wind, current, etc.).

Some foundations take the form of a foundation pile, also known as a "monopile".

The anchoring into the ground of such a foundation pile is then advantageously obtained by driving operations.

For that purpose, the foundation pile is positioned above its anchoring point, then driven into the sea ground using driving equipment (for example, a hydraulic hammer) down to the suitable depth.

Implementation of these driving operations may be tricky. It is indeed advisable to maintain the foundation pile/driving equipment unit vertically above the anchoring point all along the driving operation.

For that purpose, the installation vessel is generally equipped with a temporary holding system for temporarily holding, during driving operations, a foundation pile intended to receive the mast of an off-shore wind turbine.

Such a temporary holding system comprises for that purpose:

- a sleeve intended to surround a section of the foundation pile, and
- a carrier frame, forming an interface between this sleeve and the floating vessel.

The sleeve is advantageously operable between two configurations, i.e. a closed configuration to delimit a through-duct, and an open configuration to clear a lateral opening for the passage of the foundation pile.

But, in practice, due to its size, the handling of the foundation pile through the lateral opening, from the storage space on the vessel, is often tricky.

It is then generally contemplated to implement sleeves with an adjustable lateral opening. But, for that purpose, the structure of the sleeve is often relatively complex.

Moreover, the installation vessel is advantageously equipped with dynamic positioning means or "DP" (a computer-controlled system that allows a ship to maintain its position using its own propelling means).

Now, this dynamic positioning may be insufficient to compensate for the relative movement of the ship, in particular in yaw direction, with respect to the desired position of installation and with respect to the foundation pile being driven.

The installation of a wind turbine park then requires an efficient solution to optimize the temporary holding of the foundation piles during driving operations.

DISCLOSURE OF THE INVENTION

In order to remedy the above-mentioned drawback of the state of the art, the present invention proposes a temporary holding system for temporarily holding, during driving operations, a foundation pile intended to receive the mast of an off-shore wind turbine.

The temporary holding system comprises:

- a sleeve delimiting a through-duct, intended to surround a section of said foundation pile and defining a longitudinal axis, advantageously a vertical longitudinal axis, and
- a carrier frame comprising an interface module that carries said sleeve, and a base that is intended to be secured to a floating vessel.

The sleeve comprises:

- a primary section, assembled to said interface module, and
- at least one secondary section, carried by said primary section and rotatable between two configurations: a closed configuration to delimit said through-duct, and an open configuration to clear a lateral opening for the passage of said foundation pile.

And according to the invention, said interface module and said primary section are assembled using bearing means intended to provide said sleeve with a rotational degree of freedom with respect to said interface module, about an axis of rotation extending coaxially to said longitudinal axis.

And said temporary holding system comprises rotating means, suitable to rotate said sleeve about said axis of rotation.

Such a temporary holding system thus offers, thanks to an optimized structure, an efficient orientation of the lateral opening of the sleeve.

This structure facilitates the handling of the foundation pile through the lateral opening, from the storage space on the vessel.

Moreover, it advantageously offers an additional component in the dynamic positioning, to compensate for the relative movement of the ship, in particular in yaw direction, with respect to the desired position of installation and with respect to the foundation pile being driven.

It also makes it possible to rotate the foundation pile, in such a way as to give it a good orientation before contact with the sea ground.

Other non-limiting and advantageous features of the product according to the invention, taken individually or according to all the technically possible combinations, are the following:

- the primary section extends over an angular sector from 150° to 250° about said longitudinal axis; the bearing means are arranged in such a way as to allow a rotational operation of said sleeve over an angular sector of at least 90° on either side of a median axis passing through said longitudinal axis; the interface module advantageously extends over an angular sector from 20° to 50° on either side of a median axis passing through the longitudinal axis.
- the bearing means comprise at least one radial bearing, preferably vertical, intended to receive the radial stresses extending radially with respect to said axis of rotation, and at least one axial bearing, preferably horizontal, intended to receive the axial stresses extending parallel to said axis of rotation; preferably, the bearing means comprise at least two radial bearings: at least one first radial bearing arranged in such a way as to receive the centrifugal axial stresses, and at least one second radial bearing arranged in such a way as to receive the centripetal axial forces; still preferably, said at least one axial bearing is interposed between said at least two radial bearings;
- the rotating means comprise at least one pinion/rack couple: at least one motor element fitted with a pinion, advantageously carried by the interface module, and at least one circular arc rack, advantageously carried by the primary section of the sleeve; preferably, the rotating means comprise at least two pinion/rack couples, preferably on either side of the primary section of the sleeve.

According to a preferred embodiment, the bearing means comprise at least one bearing comprising a contact roller bearing that contains rolling elements, and a smooth raceway, centred on said axis of rotation.

Other non-limiting and advantageous features of this preferred embodiment according to the invention, taken individually or according to all the technically possible combinations, are the following:

- said at least one radial bearing comprises a radial contact roller bearing that contains rolling elements, and a smooth, circular arc raceway, coaxial and parallel to said axis of rotation, and said at least one axial bearing comprises an axial contact roller bearing that contains rolling elements, and a smooth, circular arc raceway, coaxial and perpendicular to said axis of rotation;
- the rolling elements consist of cylindrical rollers, distributed along at least one row; preferably, the cylindrical rollers are connected to each other to form at least one chain of cylindrical rollers;
- said at least one bearing comprises several roller bearing modules each containing at least one chain of cylindrical rollers; and within each roller bearing module, the chain of cylindrical rollers forms a chain of recirculating cylindrical rollers that includes an active strand cooperating with the raceway, and a return strand; the roller bearing modules are distributed over part of the circumference of the axis of rotation;
- the rolling elements are carried by the interface module, and the raceway is carried by the primary section of the sleeve.

The present invention also relates to the floating vessel, including:

- a temporary holding system according to the invention, and
- a system for driving said foundation pile held in said temporary holding system.

The present invention also relates to the method for temporarily holding, during driving operations, a foundation pile intended to receive the mast of an off-shore wind turbine by implementation of a temporary holding system according to the invention.

The holding method comprises a step of positioning said foundation pile into the through-duct of said sleeve.

This positioning step comprises:

- a rotational operation of said at least one secondary section in said open configuration, and
- a rotational operation of said sleeve with respect to the interface module, taking into account the desired orientation of said lateral opening and advantageously to correct the possible yaw movements of the floating vessel.

Obviously, the different features, alternatives and embodiments of the invention can be associated with each other according to various combinations, insofar as they are not incompatible or exclusive with respect to each other.

DETAILED DESCRIPTION OF THE INVENTION

Moreover, various other features of the invention emerge from the appended description made with reference to the drawings that illustrate non-limiting embodiments of the invention, and wherein.

Figure 1:
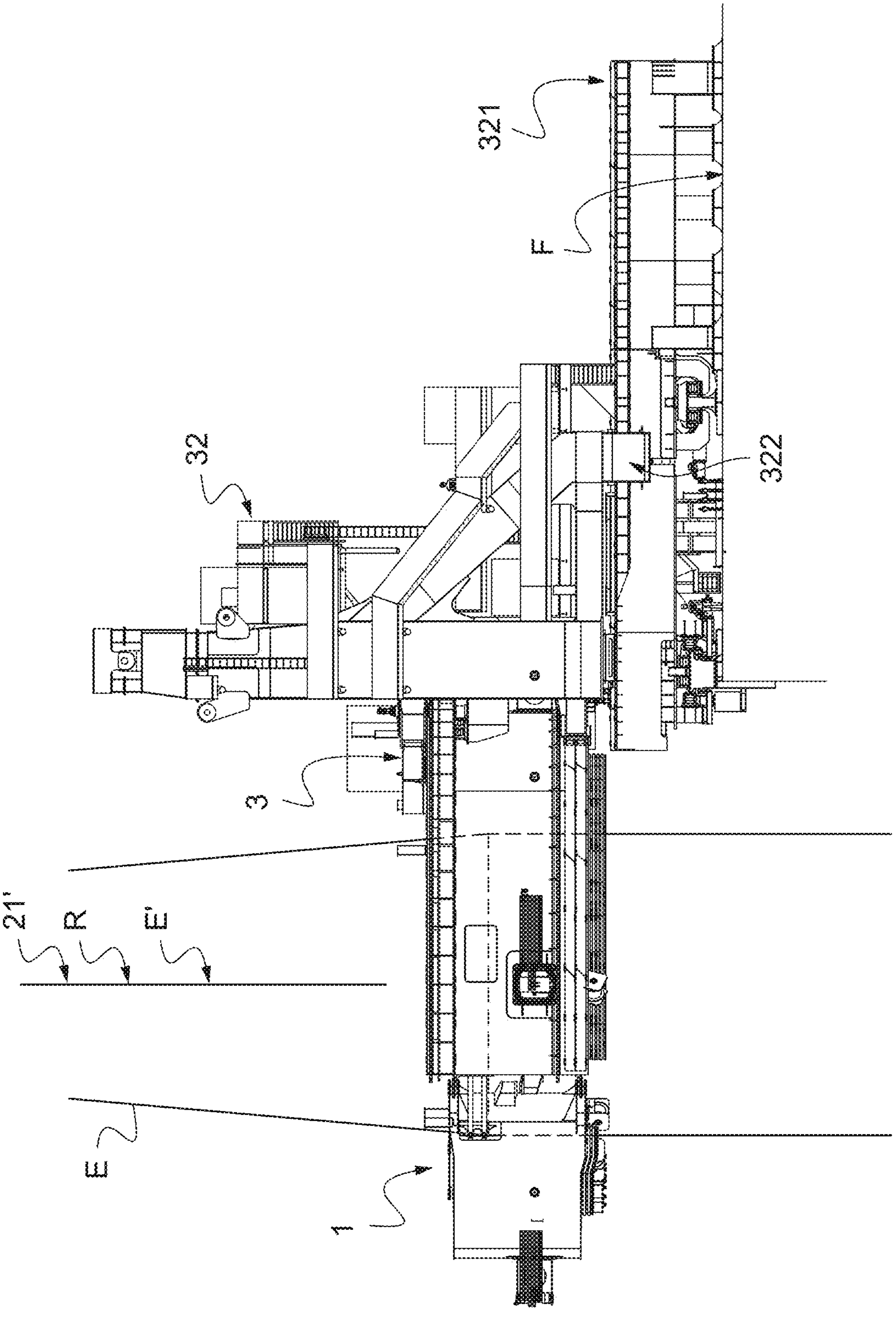
FIG. 1 is an overall and partial view of a floating vessel according to the invention, illustrating the temporary holding system thereof ensuring the holding of a foundation pile.

It is to be noted that, in these figures, the structural and/or functional elements common to the different alternatives may have the same references.

The temporary holding system 1, described hereinafter in relation with the figures, consists of a system for temporarily holding a foundation pile E intended to receive the mast of an off-shore wind turbine (not shown).

Generally, a wind turbine advantageously comprises three main portions:

a mast, a nacelle positioned at the top of the mast, and a rotor composed of three blades inserted in a hub.

An off-shore wind turbine, or "sea wind turbine", is intended to be implanted on a foundation that is anchored into the sea bottom.

In such an off-shore wind turbine, the electrical energy is advantageously transmitted to the foot of the tower, where it is adapted by a converter and a transformer, in such a way as to be exported towards a sea power station via inter-wind turbine cables.

The mast of the off-shore wind turbine est here added on a foundation pile E, also called "monopile", intended to be implanted into the sea bottom by driving operations.

The mast is generally connected to this foundation pile E through a joint topped with a transition piece.

The temporary holding system 1 is in particular adapted to hold this foundation pile E during driving operations.

For that purpose, this temporary holding system 1 is advantageously intended to be fitted on a floating vessel F (illustrated very partially and schematically in FIG. 1), which is adapted for installation of foundation piles E by driving, or even installation of off-shore wind turbines on the installed foundation piles E.

Preferably, such a floating vessel F includes:

a temporary holding system 1 according to the invention, advantageously fitted on the deck thereof, a driving system (not shown), for driving said foundation pile E held in the temporary holding system 1, and preferably, dynamic positioning means or "DP", conventional per se (a computer-controlled system that allows a ship to maintain its position using its own propelling means).

The driving system, for example a hydraulic hammer, is intended to top the foundation pile E held by the temporary holding system 1 and to axially hurt the free upper end of this foundation pile E to ensure the anchoring thereof into the ground. Such a foundation pile E, generally made of steel, is held and guided vertically by the temporary holding system 1 during the anchoring thereof into the ground by being driven thanks to the driving operations.

According to the invention and generally, the temporary holding system 1 comprises:

a sleeve 2 intended to surround a section of the foundation pile E, and a carrier frame 3 arranged between the sleeve 2 and the floating vessel F.

As explained in more detail hereinafter, the sleeve 2 is rotatable with respect to the carrier frame 3, about an axis of rotation R that extends coaxially to the longitudinal axis 21' of the sleeve 2.

Sleeve

The sleeve 2 is advantageously intended to surround/enclose a section of the foundation pile E and to hold the longitudinal axis E' of this foundation pile E in a vertical orientation and advantageously at a determined geolocation.

For that purpose, the sleeve 2 delimits a through-duct 21, intended to surround a section of the foundation pile E.

This through-duct 21 defines a longitudinal axis 21' (also called longitudinal axis of the sleeve 2), advantageously a vertical longitudinal axis 21'.

Figure 2:
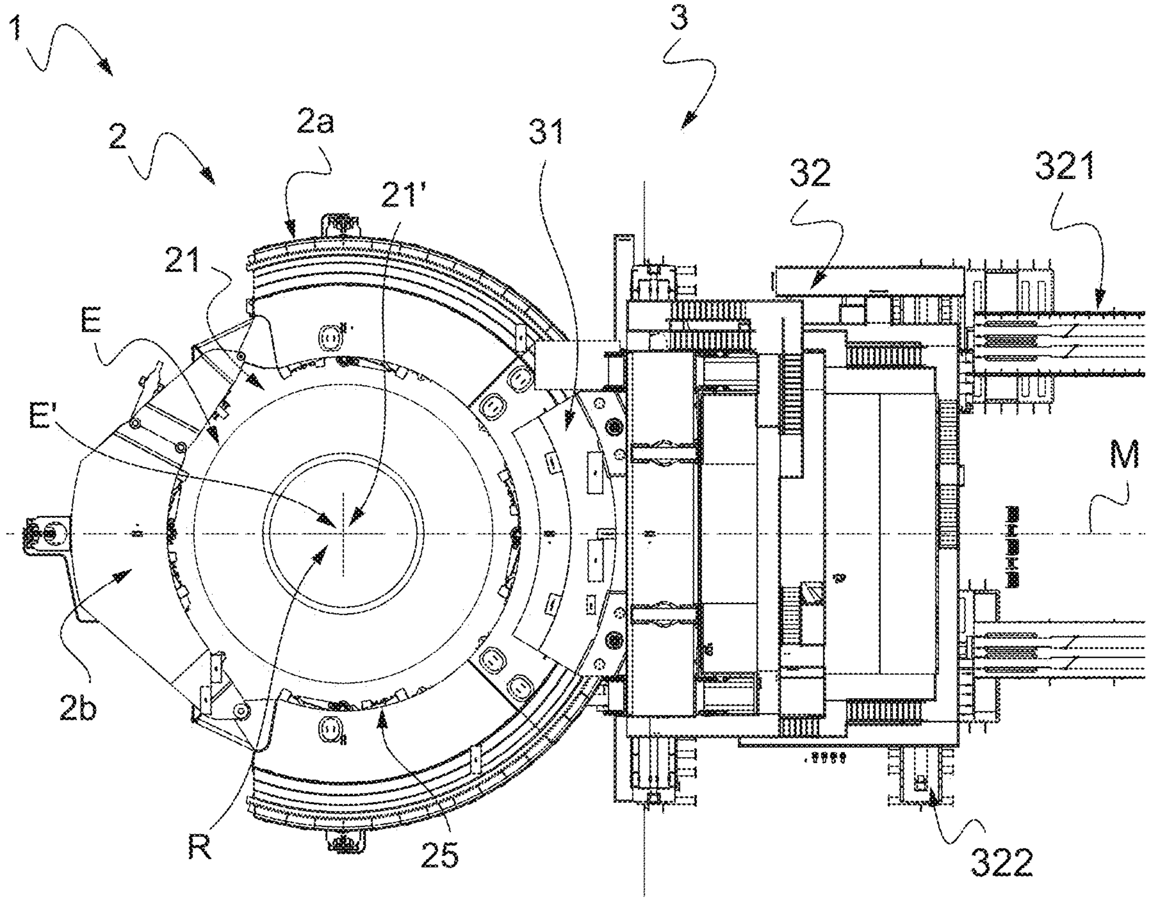
FIG. 2 is a general top view of the floating vessel according to FIG. 1.
Figure 3:
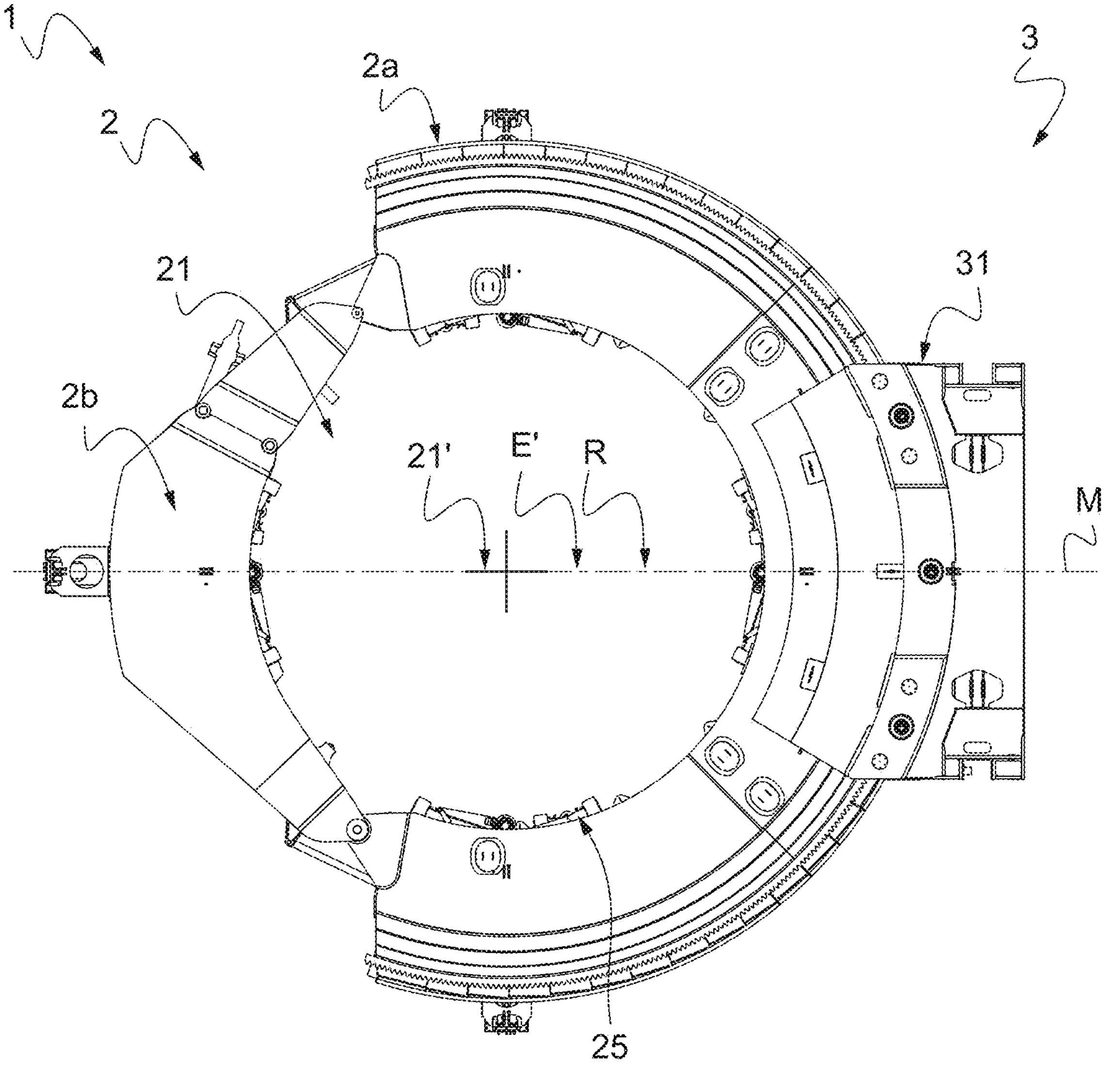
FIG. 3 is an isolated top view of the temporary holding system, showing in particular the sleeve thereof in closed configuration, carried by the interface module thereof.
Figure 4:
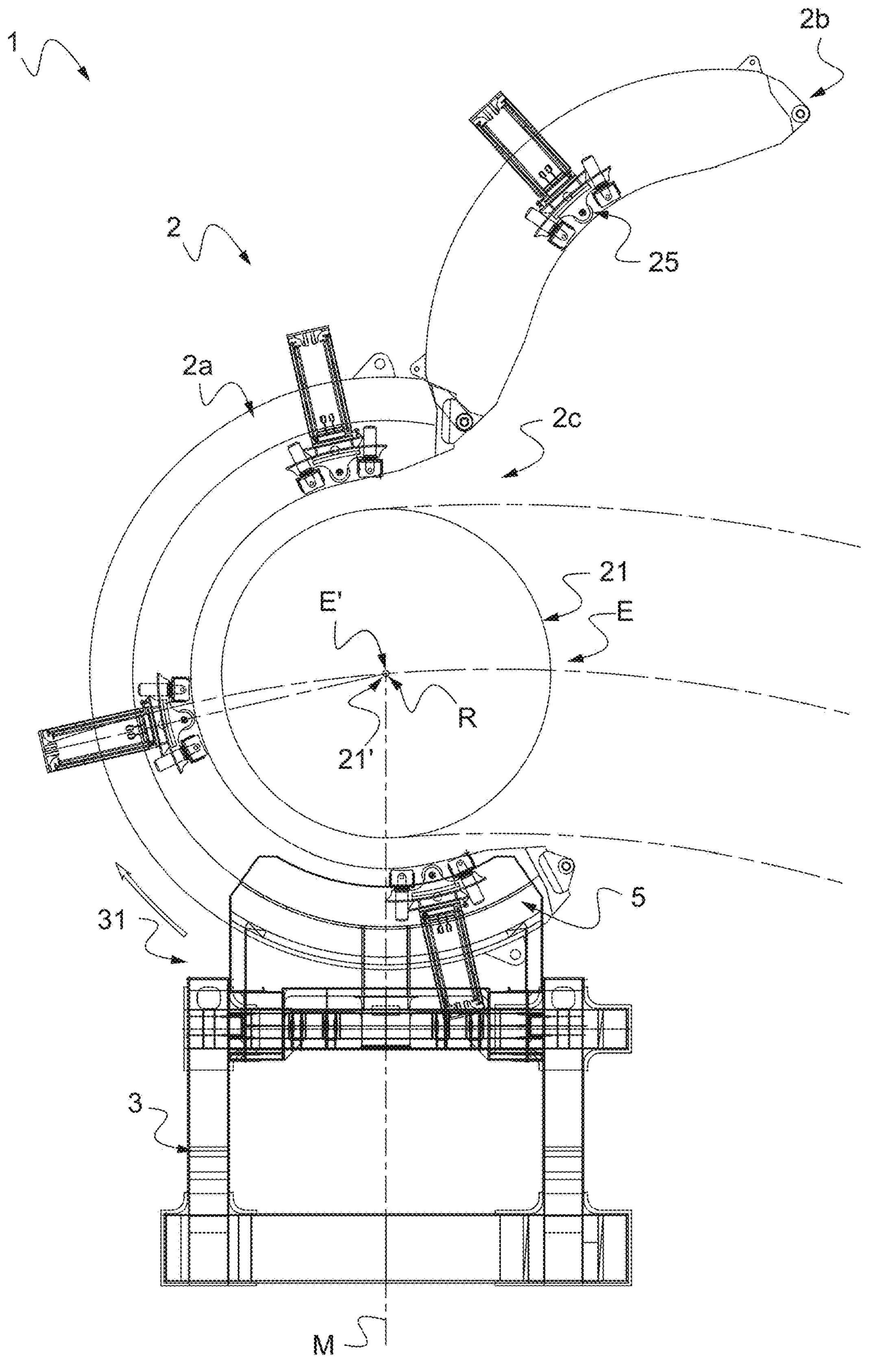
FIG. 4 is a schematic view of FIG. 3, illustrating the sleeve thereof in open configuration and after a rotation to orient laterally the radial passage allowing the entry/exit of the foundation pile.

The sleeve 2 has also advantageously a median axis M, passing through the longitudinal axis 21', and perpendicular to this longitudinal axis 21' (FIGS. 2 to 4). This longitudinal axis 21' also advantageously passes through the carrier frame 3.

Generally, the sleeve 2 comprises:

a primary section 2*a* (or primary portion), assembled with the carrier frame 3 (via an interface module 31 described hereinafter), and at least one secondary section 2*b* (or secondary portion), carried by the primary section 2*a* and rotatable with respect to this primary section 2*a*.

The sections 2*a*, 2*b* of the sleeve 2 are advantageously generally circular arc-shaped and arranged in series.

In particular, said at least one secondary section 2*b* is operable between two configurations:

a closed configuration (FIGS. 2 and 3), to delimit the through-duct 21, and an open configuration (FIG. 4), to clear a lateral opening 2*c* for the passage of the foundation pile E (towards the through-duct 21 or out of the through-duct 21), for example by means of a manoeuvring crane.

Said at least one secondary section 2*b* is advantageously operable with a rotational degree of freedom that is parallel to the longitudinal axis 21' of the sleeve 2.

By "lateral opening 2*c*", it is advantageously understood a radial opening with respect to the longitudinal axis 21' of the sleeve 2.

In other words, in the closed configuration, the sleeve 2 advantageously defines a continuous ring; the through-duct 21 is closed over its circumference; it opens above and below the through-duct 21.

In the open configuration, the sleeve 2 advantageously defines a discontinuous ring, interrupted by the lateral opening 2*c*.

Still generally, the sleeve 2 advantageously includes clamp segments 25, intended to bear against the section of the foundation pile E.

Figure 10:
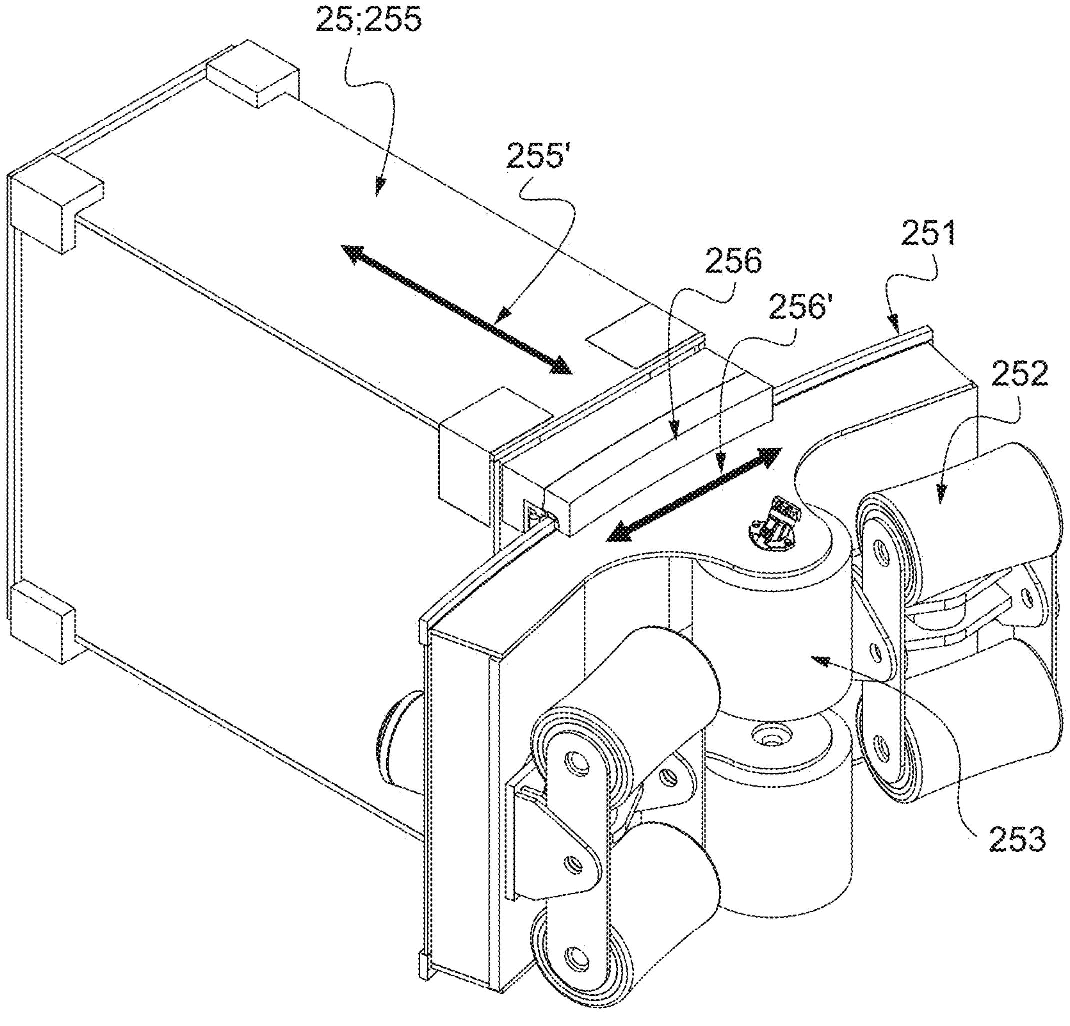
FIG. 10 illustrates, in details, one of these clamp segments.

One of these clamp segments 25 is illustrated in details in FIG. 10.

The clamp segments 25, for example at least four in number, are distributed over the circumference of the longitudinal axis 21' of the through-duct 21 and each comprise a clamp head 251.

To cooperate with the section of the foundation pile E, the clamp head 251 advantageously comprises a combination of rollers 252, 253, i.e.:

first rollers 252, oriented perpendicular to the longitudinal axis 21' of the sleeve 2, advantageously free in rotation, to maintain a contact during a relative translational movement of the foundation pile E with respect to the sleeve 2, and possibly second rollers 253 oriented parallel to the longitudinal axis 21' of the sleeve 2, advantageously motorized, to pilot a relative rotation between the foundation pile E and the sleeve 2.

The first rollers 252 are in particular intended to travel over the length of the foundation pile E during driving operations and also to compensate for the vertical movements of the floating vessel F.

The second rollers 253 are useful to operate the foundation pile E about its longitudinal axis before installation on the ground.

Preferably, the first rollers 252 and/or the second rollers 253 cooperate with operating means (not shown) between a retracted position/an extended position.

These operating means, for example an electric motor, are useful to position, alternately, the first rollers 252 and the second rollers 253 in contact with the foundation pile E.

Still preferably, a clamp segment 25 includes complementary operating means, i.e.:

means 255 for operating its clamp head 251 in translation along a radial translation axis 255', radial with respect to the longitudinal axis 21' of the sleeve 2, and/or means 256 for operating its clamp head 251 in rotation along a circular arc trajectory 256', whose centre corresponds to the longitudinal axis 21' of the sleeve 2.

The translational operating means 255 consist for example in electric cylinders or hydraulic cylinders. They are useful to adjust the clamp head 251 as a function of the diameter of the foundation pile E and to take into account the potential variations of diameter of the latter during driving operations.

The rotating means 256 consist for example in a slide system associated with a pinion/crown couple. They are useful to follow the yaw movement of the floating vessel F about the longitudinal axis E' of the foundation pile E during the driving, or also for the rotational operation of the sleeve 2 about its axis of rotation R, while maintaining the contact of the first rollers 252 with this foundation pile E.

Carrier Frame

The carrier frame 3 comprises:

an interface module 31 that carries the sleeve 2 and in particular its primary section 2*a*, and a base 32 that is intended to be secured to the floating vessel F.

Preferably, the base 32 is adapted to pilot the sleeve 2 along two translational degrees of freedom (advantageously in X-Y) that are perpendicular to the longitudinal axis 21' of its through-duct 21 (advantageously in Z).

The carrier frame 3 thus aims to keep a determined geolocation of the sleeve 2, all along the driving operations.

For that purpose, as schematically shown in FIG. 1, the base 32 comprises for example:

slide means 321, defining the two translational degrees of freedom between the sleeve 2 (with its interface module 31) and the base 32, and operating means 322, intended to generate movements of the sleeve 2 (with its interface module 31) with respect to the floating vessel F, along two translational degrees of freedom.

Bearing Means

According to the invention, the sleeve 2 has a rotational degree of freedom with respect to said interface module 31. This rotational degree of freedom is defined about an axis of rotation R that extends coaxially to the longitudinal axis 21' of the sleeve 2.

Figure 5:
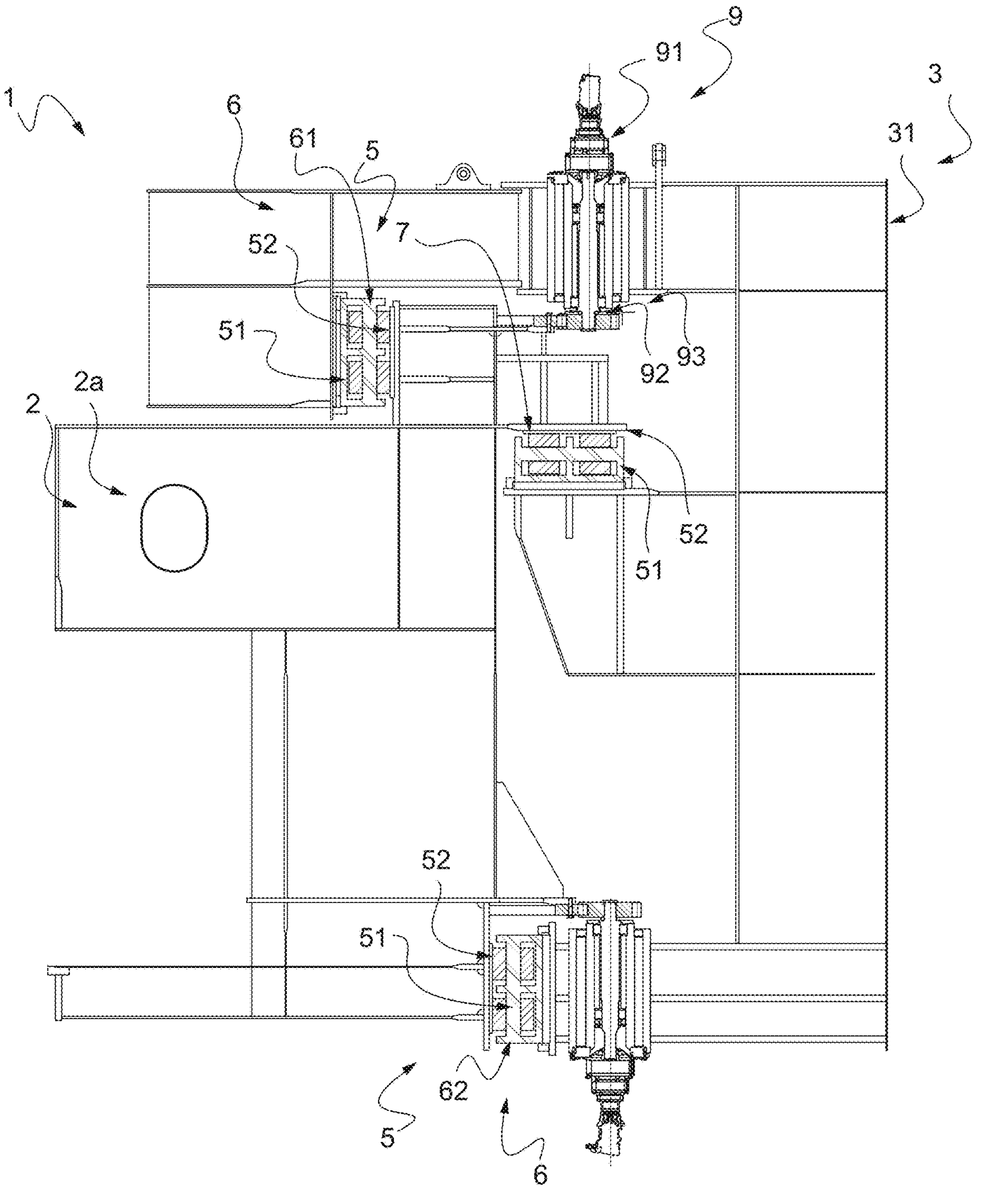
FIG. 5 is a schematic partial view of the temporary holding system, according to an axial cross-sectional plane, showing the arrangement of the bearing means.

For that purpose, as schematically shown in FIGS. 4 and 5, the interface module 31 and the primary section 2*a* of the sleeve 2 are assembled using bearing means 5 that are intended to provide said sleeve 2 with this rotational degree of freedom with respect to said interface module 31.

And the temporary holding system 1 comprises rotating means 9, suitable to rotate the sleeve 2 about the above-mentioned axis of rotation R.

In other words, as illustrated in FIG. 4, the sleeve 2 is advantageously rotatable about the axis of rotation R, in such a way that said at least one secondary section 2*b* and its associated lateral opening 2*c* are operable about the axis of rotation R, at least on one side of the median axis M, advantageously on either side of the median axis M.

In still other words, the primary section 2*a* of the sleeve 2 is intended to travel in translation with respect to the interface module 31 (along a circular arc stroke).

Generally, the primary section 2*a* advantageously extends over an angular sector from 150° to 250° about the longitudinal axis 21'.

The bearing means 5 are preferably arranged in such a way as to allow a rotational operation of the sleeve 2 (also known as "rotational stroke") over an angular sector of at least 90° on either side of the median axis M.

In other words, the sleeve 2 is advantageously movable between two rotational end positions (FIG. 4), advantageously symmetrical on either side of the median axis M, in which the lateral opening 2*c* is advantageously at right angles with respect to the median axis M.

And these rotational end positions advantageously extend from a nominal angular position in which the lateral opening 2*c* is passed through by the median axis M, advantageously opposite to the interface module 31 (FIG. 3).

Moreover, the interface module 31 advantageously extends over an angular sector from 20° to 50° on either side of the median axis M.

According to a preferred embodiment, described hereinafter in connection with FIG. 5, the bearing means 5 comprise a combination of bearings 5:

at least one radial bearing 6, preferably vertical, intended to receive the radial stresses extending radially with respect to the axis of rotation R (in other words, the stresses extending perpendicular to the axis of rotation R), and at least one axial bearing 7, preferably horizontal, intended to receive the axial stresses extending parallel to said axis of rotation R.

Figure 8:
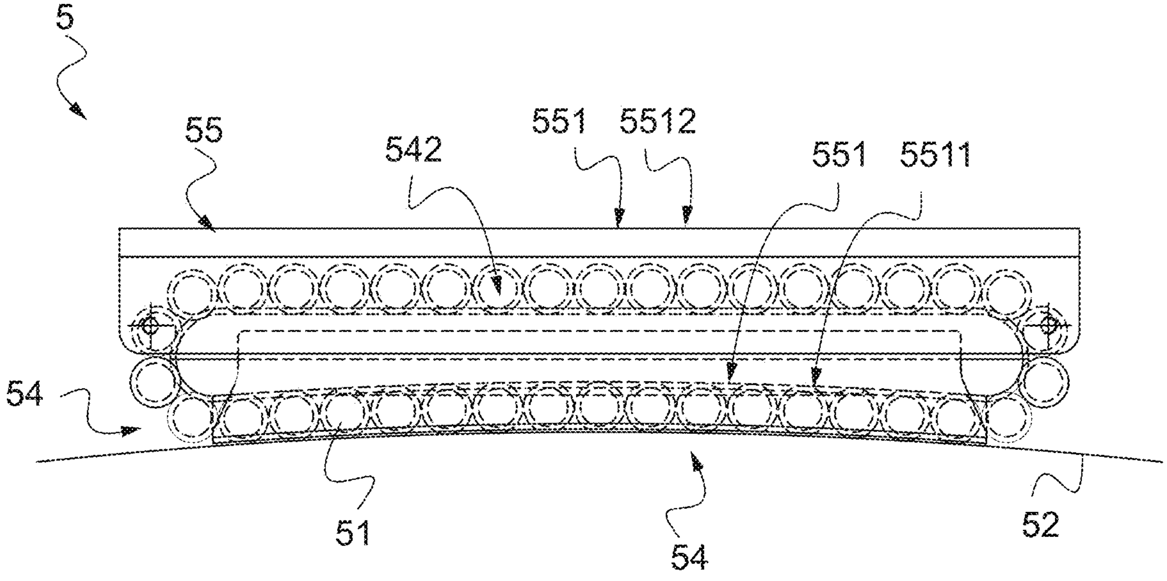
FIG. 8 is a schematic and isolated, cross-sectional view of a rolling element that is adapted to cooperate with a smooth, convex, circular arc raceway, coaxial and parallel to said axis of rotation.
Figure 9:
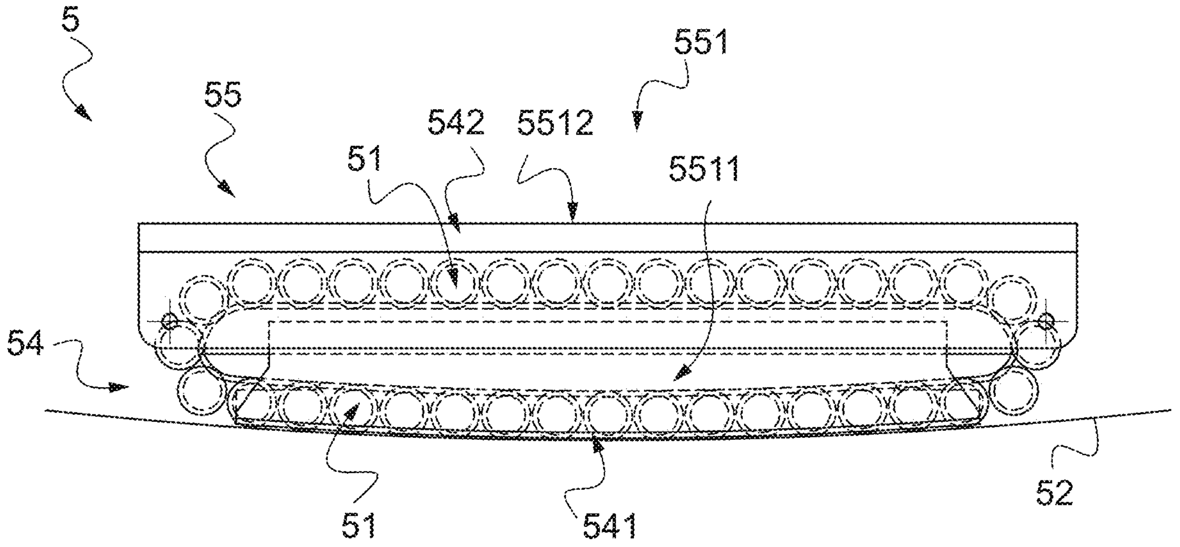
FIG. 9 is a schematic and isolated, cross-sectional view of a rolling element that is adapted to cooperate with a smooth, concave, circular arc raceway, coaxial and parallel to said axis of rotation.

Still preferably, the bearing means 5 here comprise at least two radial bearings 6, complementary to each other, i.e.:

at least one first radial bearing 61, also illustrated in FIG. 8, arranged in such a way as to receive the centrifugal axial stresses (that is to say the stresses extending perpendicular to the axis of rotation R and directed away from the axis of rotation R), and at least one second radial bearing 62, also illustrated in FIG. 9, arranged in such a way as to receive the centripetal axial stresses (in other words, the stresses extending perpendicular to the axis of rotation R and directed towards the axis of rotation R).

The radial bearings 61, 62 are advantageously distributed at the upper and lower faces of the sleeve 2.

This combination advantageously allows an optimum holding of the sleeve 2 and an optimum guiding of the sleeve 2 about its axis of rotation R.

Moreover, said at least one axial bearing 7 is preferably intended to receive the vertical stresses, corresponding to the vertical force of bearing of the sleeve 2 on the interface module 31.

Herein, said at least one axial bearing 7 is here advantageously interposed between said at least two radial bearings 6, advantageously in order to support the vertical load of the sleeve 2.

Generally, according to the invention, said at least one bearing 5 advantageously comprises a contact roller bearing that includes:

rolling elements 51, and a smooth raceway 52, centred on the axis of rotation R.

Within this framework, on the one hand, as illustrated in FIGS. 8 and 9, said at least one radial bearing 6 advantageously comprises a radial contact roller bearing that includes:

rolling elements 51, and a smooth, circular arc raceway 52, coaxial and parallel to the axis of rotation R.

The circular arc raceway 52 of this radial bearing 6 thus advantageously consists of a tubular section, with a circular arc cross-section, adapted to serve as a rolling surface for the rolling elements 51 during the rotation of the sleeve 2 with respect to the interface module 31.

This cylindrical raceway 52 is advantageously coaxial and parallel to the axis of rotation 21' of the sleeve 2.

And, on the other hand, said at least one axial bearing 7 advantageously comprises an axial contact roller bearing that includes:

- rolling elements 51, and
- a smooth, circular arc raceway 52, coaxial and perpendicular to the axis of rotation R.

The cylindrical raceway 52 of this axial bearing 7 thus advantageously consists of a crown portion, adapted to serve as a rolling surface for the rolling elements 51 during the rotation of the sleeve 2 with respect to the interface module 31.

This cylindrical raceway 52 is advantageously coaxial and perpendicular to the axis of rotation 21' of the sleeve 2.

Generally and herein, the rolling elements 51 advantageously consist of cylindrical rollers 51 distributed along at least one row.

Herein, said at least one radial bearing 6 advantageously includes two superposed rows of cylindrical rollers 51. And said at least one axial bearing 7 advantageously includes two concentric rows of cylindrical rollers 51.

Each cylindrical roller 51 here has a longitudinal axis 51', which defines its axis of rotation.

Figure 6:
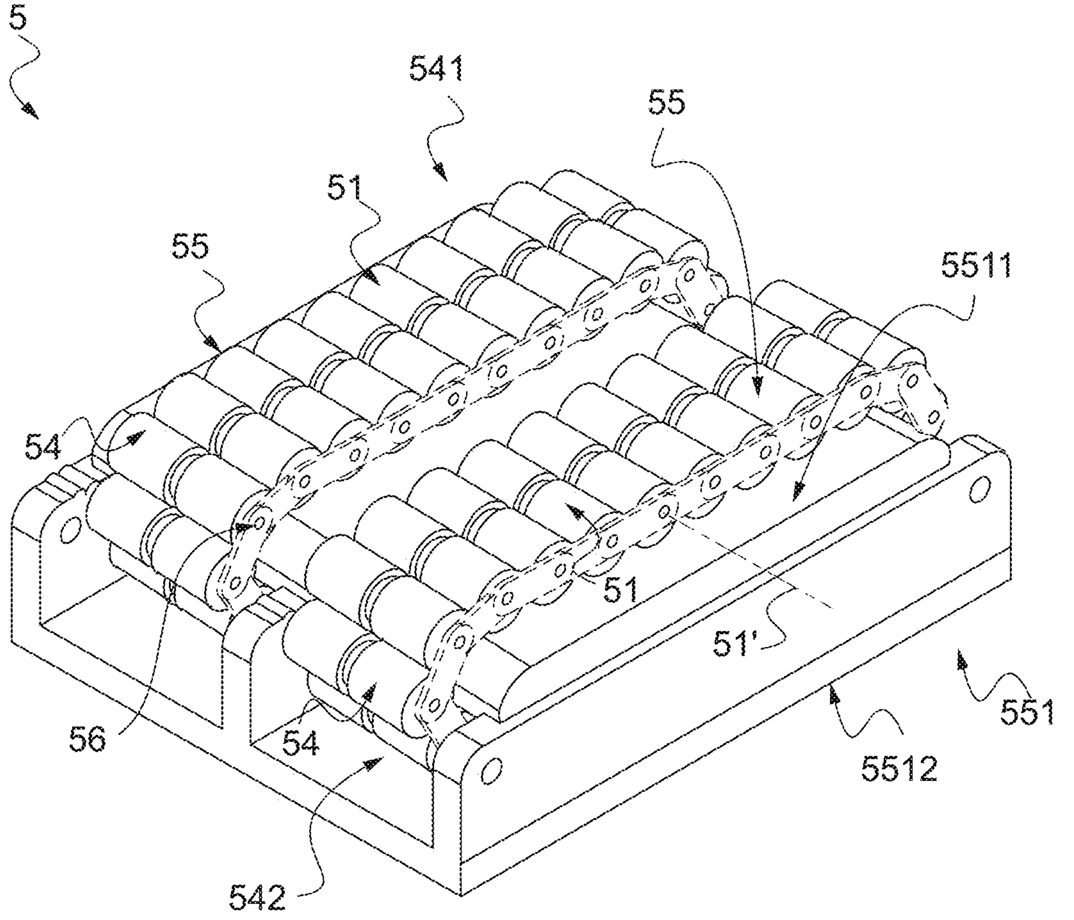
FIG. 6 is a schematic and isolated, perspective view of a rolling element constituting the bearing means.
Figure 7:
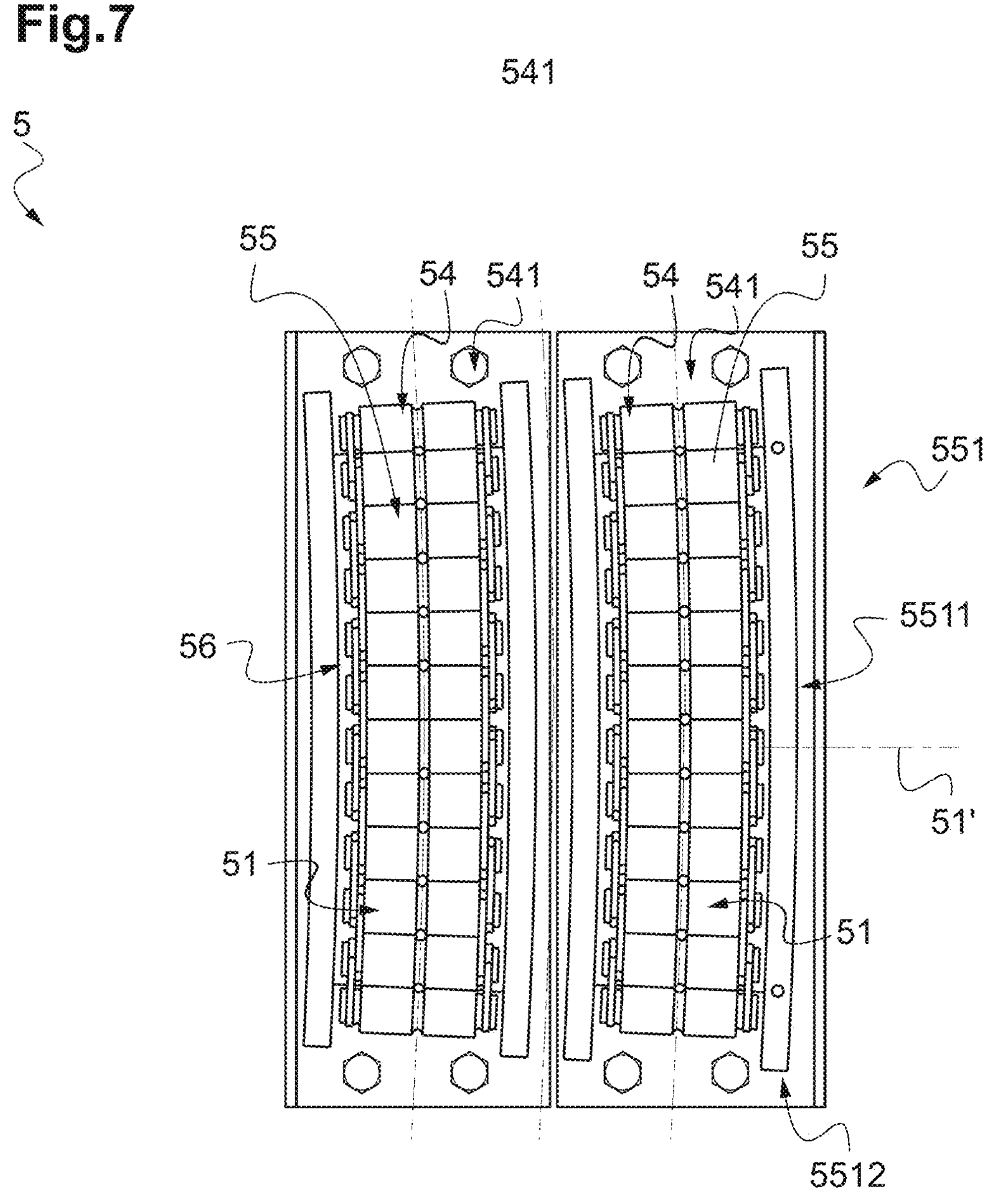
FIG. 7 is a schematic and isolated, perspective view of a rolling element that is adapted to cooperate with a smooth circular arc raceway, coaxial and perpendicular to the axis of rotation.

In a row, these cylindrical rollers 51 are advantageously connected to each other using links 56, to form at least one chain 54 of cylindrical rollers 51 (see in particular FIGS. 6 and 7).

In particular, within a radial bearing 6, the longitudinal axis 51' of the cylindrical rollers 51 advantageously extends parallel to the axis of rotation R of the sleeve 2.

A row of cylindrical rollers 51 advantageously extends in a plane perpendicular to the axis of rotation R.

As an alternative, within an axial bearing 7, the longitudinal axis 51' of the cylindrical rollers 51 advantageously extends perpendicular to the axis of rotation R of the sleeve 2 and radially with respect to this axis of rotation R of the sleeve 2.

A row of cylindrical rollers 51 advantageously extends in a circle concentric to the axis of rotation R.

Still preferably, said at least one bearing 5 comprises several roller bearing modules 55 each containing at least one chain 54 of cylindrical rollers 51.

Within a chain 54, these cylindrical rollers 51 are advantageously connected to each other by links 56 to maintain the spacing between the successive cylindrical rollers 51 (FIG. 6).

The links 56 are moreover advantageously arranged, between two successive cylindrical rollers 51, to provide a rotational clearance between two successive cylindrical rollers 51.

At said at least one axial bearing 7, the longitudinal axes 51' of the cylindrical rollers 51 are advantageously converging at the longitudinal axis 21' of the sleeve 2.

The longitudinal axes 51' of the cylindrical rollers 51 advantageously cross each other at the longitudinal axis 21' of the sleeve 2.

Such an arrangement is in particular interesting for said at least one axial bearing 7, in such a way as to allow a rolling on a crown portion raceway (FIG. 7).

Generally, the roller bearing modules 55 are distributed over part of the circumference of the axis of rotation R.

Still preferably, the rolling elements 51 are carried by the interface module 31. And the raceway 52 is carried by the primary section **2*a* of the sleeve 2**.

Within this framework, the interface module 31 advantageously contains at least two rolling elements 51, belonging to said at least one radial bearing 6 and said at least one axial bearing 7, respectively.

In parallel, the primary section **2*a* of the sleeve advantageously contains at least two raceways 52, belonging to said at least one radial bearing 6 and said at least one axial bearing 7**, respectively.

Still preferably, as shown in FIG. 8, the rolling elements 51 of the first radial bearing 61 advantageously define together a concave, outer tangential surface, directed towards the axis of rotation R. And the complementary raceway 52 thus advantageously consists of a convex, inner crown portion, directed away from the axis of rotation R.

Still preferably, as shown in FIG. 9, the rolling elements 51 of the second radial bearing 62 advantageously define together a convex, inner tangential surface, directed away from the axis of rotation R. And the complementary raceway 52 thus advantageously consists of a concave, outer crown portion, directed towards the axis of rotation R.

Still preferably, the rolling elements 51 of the axial bearing 7 advantageously define together a lower crown surface, directed upwards. And the complementary raceway 52 thus advantageously consists of an upper crown portion, directed downwards.

Still generally, as shown in particular in FIG. 6, within each roller bearing module 55, the chain 54 of cylindrical rollers 51 forms a chain 54 of recirculating cylindrical rollers 51 that includes:

- an active strand 541 cooperating with the raceway 52, and
- a return strand 542.

Herein, the active strand 541 defines a tangential surface having a circular arc cross-section, whose radius of curvature corresponds to the complementary cylindrical raceway 52.

The return strand 542 is advantageously rectilinear.

For that purpose, the roller bearing module 55 advantageously comprises a support frame 551 including two parts:

- a guiding part 5511, guiding the chain 54 of recirculating cylindrical rollers 10 and defining the shape of the strands of the chain of recirculating cylindrical rollers 10, and
- a mounting part 5512, for its mounting to the support structure 3.

The roller bearing modules 55 are distributed, in series, over part of the circumference of the axis of rotation 21' and/or at least part of the length of the primary section **2*a***, juxtaposed to each other.

The active strands 541 of the roller bearing modules 55 hence define together a tangential surface having a circular arc tangential surface whose radius of curvature corresponds to the complementary cylindrical raceway 52.

In still other words, the active strands 541 of the roller bearing modules 55 define together a circular arc tangential surface that is concentric to the axis of rotation R of the sleeve 2.

As an alternative, the rolling elements 51 may be advantageously chosen among a series of wheels (not shown), for example in the form of carriages or bogies.

Rotating Means

As shown in FIG. 5, the rotating means 9 preferably comprise at least one pinion/rack couple, with:

- at least one motor element 91 fitted with a pinion 92, advantageously carried by the interface module 31, and at least one circular arc rack 93, advantageously carried by the primary section 2*a* of the sleeve 2.

The rotating means 9 advantageously comprise at least two pinion 92/rack 93 couples, preferably on either side of the primary section 2*a* of the sleeve 2.

Method for Temporary Holding During Driving Operations

During driving operations, the temporary holding system 1 according to the invention is implemented for temporarily holding a foundation pile E intended to receive the mast of an off-shore wind turbine.

The holding method comprises a step of positioning said foundation pile E into the through-duct 21 of said sleeve 2.

As shown in FIG. 5, this positioning step comprises:

a rotational operation of said at least one secondary section 2*b* to the open configuration, and a rotational operation of the sleeve 2 with respect to the interface module 31, about its axis of rotation R, taking into account the desired orientation of the lateral opening 2*c* and advantageously to correct the possible yaw movements of the floating vessel F.

The sleeve 2 can then be rotated towards at least one side of the median axis M, in a clockwise direction (FIG. 4) and/or an anti-clockwise direction (not shown) from the nominal angular position (FIG. 3).

Once the foundation pile E positioned, a rotational operation of said at least one secondary section 2*b* is implemented, in the closed configuration; and the sleeve 2 is advantageously rotated about its axis of rotation R in such a way as to bring it back to its nominal angular position (FIG. 3).

During this rotational operation, the clamp segments 25 are extended and advantageously travel along the section facing the foundation pile E.

During driving operations, the sleeve 2 is advantageously rotated with respect to the interface module 31, about its axis of rotation R, to correct the potential yaw movements of the floating vessel F.

Of course, various other modifications may be made to the invention within the scope of the appended claims.

The invention claimed is:

1. A temporary holding system for temporarily holding, during driving operations, a foundation pile (E) intended to receive a mast of an off-shore wind turbine, wherein said temporary holding system (1) comprises:

a sleeve (2) delimiting a through-duct (21), intended to surround a section of said foundation pile (E) and defining a longitudinal axis (21'), and a carrier frame (3) comprising an interface module (31) that carries said sleeve (2), and a base (32) that is intended to be secured to a floating vessel, wherein said sleeve (2) comprises:

a primary section (2*a*), assembled to said interface module (31), and at least one secondary section (2*b*), carried by said primary section (2*a*) and rotatable between two configurations: a closed configuration to delimit said through-duct (21), and an open configuration to clear a lateral opening (2*c*) for a passage of said foundation pile (E), wherein said interface module (31) and said primary section (2*a*) are assembled using bearing means (5) intended to provide said sleeve (2), comprising said primary section (2*a*) and said secondary section (2*b*), with a rotational degree of freedom with respect to said interface module (31), about an axis of rotation (R) extending coaxially to said longitudinal axis (21'), and wherein said temporary holding system (1) comprises rotating rotational operation means (9), suitable to rotate said sleeve (2), comprising said primary section (2*a*) and said secondary section (2*b*), according to a rotation movement about said axis of rotation (R).

2. The temporary holding system according to claim 1, wherein the primary section (2*a*) extends over an angular sector from 150° to 250° about said longitudinal axis (21'), wherein the bearing means (5) are arranged in such a way as to allow a rotational operation of said sleeve (2) over an angular sector of at least 90° on either side of a median axis (M) passing through said longitudinal axis (21').

3. The temporary holding system according to claim 1, wherein the bearing means (5) comprise:

at least one radial bearing (6), intended to receive radial stresses extending radially to said axis of rotation (R), and at least one axial bearing (7), intended to receive axial stresses extending parallel to said axis of rotation (R).

4. The temporary holding system according to claim 3, wherein the bearing means (5) comprise at least two radial bearings (6):

at least one first radial bearing (61), arranged in such a way as to receive centrifugal axial stresses, and at least one second radial bearing (62), arranged in such a way as to receive centripetal axial stresses.

5. The temporary holding system according to claim 1, wherein the bearing means (5) comprise at least one bearing (6, 7) comprising a contact roller bearing that contains:

rolling elements (51), and a smooth raceway (52), centred on said axis of rotation (R).

6. The temporary holding system according to claim 5, wherein the bearing means (5) comprise:

at least one radial bearing (6), intended to receive the radial stresses extending radially to said axis of rotation (R), and at least one axial bearing (7), intended to receive the axial stresses extending parallel to said axis of rotation (R), and wherein said at least one radial bearing (6) comprises a radial contact roller bearing that contains:

rolling elements (51), and a smooth, circular arc raceway (52), coaxial and parallel to said axis of rotation (R), and wherein said at least one axial bearing (7) comprises a contact roller bearing that contains:

rolling elements (51), and a smooth, circular arc raceway (52), coaxial and perpendicular to said axis of rotation (R).

7. The temporary holding system according to claim 6, wherein the rolling means (51) consist of cylindrical rollers (51), distributed along at least one row.

8. The temporary holding system according to claim 5, wherein the rolling means (51) consist of cylindrical rollers (51), distributed along at least one row.

9. The temporary holding system according to claim 8, wherein the cylindrical rollers (51) are connected to each other to form at least one chain (54) of cylindrical rollers (51).

10. The temporary holding system according to claim 9, wherein said at least one bearing (6, 7) comprises several roller bearing modules (55) each containing at least one chain (54) of cylindrical rollers (51), and wherein, within each roller bearing module (55), the at least one chain (54) of cylindrical rollers (51) forms a chain (54) of recirculating cylindrical rollers (51) that includes:

an active strand (541) cooperating with the raceway (52), and a return strand (542), wherein said roller bearing modules (55) are distributed over part of a circumference of the axis of rotation (R).

11. The temporary holding system according to claim 5, wherein the rolling elements (51) are carried by the interface module (31), and wherein the raceway (52) is carried by the primary section (2*a*) of the sleeve (2).

12. The temporary holding system according to claim 5, wherein the bearing means (5) comprise at least two radial bearings (6) including:

at least one first radial bearing (61), arranged in such a way as to receive centrifugal axial stresses, at least one second radial bearing (62), arranged in such a way as to receive centripetal axial stresses, and at least one axial bearing (7), and wherein said at least two radial bearings (6) comprise a radial contact roller bearing that contains:

rolling elements (51), and a smooth, circular arc raceway (52), coaxial and parallel to said axis of rotation (R), and wherein said at least one axial bearing (7) comprises a contact roller bearing that contains:

rolling elements (51), and a smooth, circular arc raceway (52), coaxial and perpendicular to said axis of rotation (R).

13. A floating vessel, including:

a temporary holding system (1) according to claim 1, and a system for driving a foundation pile (E) held in said temporary holding system (1).

14. A method for temporarily holding, during driving operations, a foundation pile (E) intended to receive a mast of an off-shore wind turbine by implementation of a temporary holding system (1) according to claim 1, wherein the holding method comprises a step of positioning said foundation pile (E) into the through-duct (21) of said sleeve (2), wherein said positioning step comprises:

a rotational operation of said at least one secondary section (2*b*) in said open configuration, and a rotational operation of said sleeve (2) with respect to the interface module (31), taking into account a desired orientation of said lateral opening (2*c*) and to correct possible yaw movements of a floating vessel.

* * * * *